United States Patent
Gloege et al.

(10) Patent No.: US 8,001,455 B2
(45) Date of Patent: Aug. 16, 2011

(54) TRANSLATION TABLE

(75) Inventors: Chad N. Gloege, Brookings, SD (US); Matthew R. Mueller, Brookings, SD (US); Neil R. Burghardt, Brookings, SD (US); Joseph G. Schulte, Brookings, SD (US); Brett D. Wendler, Watertown, SD (US)

(73) Assignee: Daktronics, Inc., Brookings, SD (US)

( * ) Notice: Subject to any disclaimer, the term of this patent is extended or adjusted under 35 U.S.C. 154(b) by 1032 days.

(21) Appl. No.: 11/805,513

(22) Filed: May 23, 2007

(65) Prior Publication Data
US 2009/0021532 A1  Jan. 22, 2009

Related U.S. Application Data

(63) Continuation-in-part of application No. 10/965,127, filed on Oct. 14, 2004, now abandoned.

(60) Provisional application No. 60/808,200, filed on May 24, 2006.

(51) Int. Cl.
*G06F 17/00* (2006.01)
(52) U.S. Cl. ........................................ 715/202
(58) Field of Classification Search .................. 715/202
See application file for complete search history.

(56) References Cited

U.S. PATENT DOCUMENTS

| | | | |
|---|---|---|---|
| 4,263,736 A | 4/1981 | Beierwaltes et al. | |
| 4,539,598 A | 9/1985 | Dietrich et al. | |
| 4,751,446 A * | 6/1988 | Pineda et al. | 345/601 |
| 4,839,726 A | 6/1989 | Balopole et al. | |
| 5,079,636 A | 1/1992 | Brody | |
| 5,151,689 A | 9/1992 | Kabuto et al. | |
| 5,164,853 A | 11/1992 | Shimazaki | |
| 5,168,375 A | 12/1992 | Reisch et al. | |
| 5,261,050 A * | 11/1993 | Fox et al. | 345/506 |
| 5,363,318 A | 11/1994 | McCauley | |
| 5,399,390 A | 3/1995 | Akins | |
| 5,440,648 A | 8/1995 | Roberts et al. | |
| 5,475,400 A | 12/1995 | Sellers et al. | |
| 5,523,769 A | 6/1996 | Lauer et al. | |
| 5,600,574 A | 2/1997 | Reitan | |
| 5,642,125 A | 6/1997 | Silverstein et al. | |
| 5,767,822 A | 6/1998 | Hiroshi et al. | |
| 5,796,376 A | 8/1998 | Banks | |

(Continued)

FOREIGN PATENT DOCUMENTS

AU   2003203350 A1   7/2003

(Continued)

OTHER PUBLICATIONS

Matkovic, "Tone Mapping Techniques and Color Image Difference in Global Illumination", Dissertation, Feb. 1998, p. 1-118.*

(Continued)

*Primary Examiner* — Amelia Rutledge
(74) *Attorney, Agent, or Firm* — Schwegman, Lundberg & Woessner, P.A.

(57) ABSTRACT

The present invention relates to image displays and signage, and more particularly, to displays of custom or arbitrary shape. Such shaped displays include channel letter displays, logo or design displays, multiple displays in an assembly, multiple display modules, curved or round displays, or other arbitrary shaped or unusual aspect ratio displays. The present invention further relates to software, apparatus, and methods for a translation table which maps graphical data from an initial shape to an arbitrary shape for use on such displays.

8 Claims, 16 Drawing Sheets

U.S. PATENT DOCUMENTS

| | | | |
|---|---|---|---|
| 5,805,117 A | 9/1998 | Mazurek et al. | |
| 5,815,168 A * | 9/1998 | May | 345/572 |
| 5,946,005 A | 8/1999 | Chiang | |
| 5,949,483 A | 9/1999 | Fossum et al. | |
| 5,949,581 A | 9/1999 | Kurtenbach et al. | |
| 6,054,968 A | 4/2000 | De Matteo | |
| 6,072,446 A | 6/2000 | Tokimoto | |
| 6,169,632 B1 | 1/2001 | Kurtenbach et al. | |
| 6,219,099 B1 | 4/2001 | Johnson et al. | |
| 6,259,838 B1 | 7/2001 | Singh et al. | |
| 6,265,984 B1 | 7/2001 | Molinaroli | |
| 6,330,111 B1 | 12/2001 | Myers | |
| 6,335,728 B1 | 1/2002 | Kida et al. | |
| 6,362,801 B1 | 3/2002 | Yuhara | |
| 6,400,340 B1 | 6/2002 | Nishida | |
| 6,536,914 B2 | 3/2003 | Hoelen et al. | |
| 6,566,824 B2 | 5/2003 | Panagotacos et al. | |
| 6,628,258 B1 | 9/2003 | Nakamura | |
| 6,639,574 B2 | 10/2003 | Scheibe | |
| 6,729,054 B1 | 5/2004 | VanderTuin | |
| 6,736,512 B2 | 5/2004 | Balogh | |
| 6,809,390 B2 | 10/2004 | Toda et al. | |
| 6,819,303 B1 | 11/2004 | Berger | |
| 6,842,164 B2 | 1/2005 | Imajo et al. | |
| 6,856,303 B2 | 2/2005 | Kowalewski | |
| 6,888,304 B2 | 5/2005 | Sato | |
| 7,049,983 B2 | 5/2006 | Azami et al. | |
| 7,091,927 B1 | 8/2006 | Hagge et al. | |
| 7,148,944 B2 | 12/2006 | Kinoshita et al. | |
| 7,161,558 B1 | 1/2007 | Eidem et al. | |
| 7,165,863 B1 | 1/2007 | Thomas et al. | |
| 7,295,362 B2 | 11/2007 | Meisburger | |
| 7,417,251 B2 | 8/2008 | Iketsu et al. | |
| 7,443,028 B2 | 10/2008 | Satou et al. | |
| 7,868,903 B2 | 1/2011 | Wendler et al. | |
| 7,893,948 B1 | 2/2011 | Mittan et al. | |
| 2001/0015709 A1 | 8/2001 | Imajo et al. | |
| 2001/0049893 A1 | 12/2001 | Maas et al. | |
| 2002/0000576 A1 | 1/2002 | Inukai | |
| 2002/0051356 A1 | 5/2002 | Takahashi et al. | |
| 2002/0088984 A1 | 7/2002 | Toda et al. | |
| 2002/0122134 A1 | 9/2002 | Kalua | |
| 2003/0031032 A1 | 2/2003 | Wu et al. | |
| 2003/0057886 A1 | 3/2003 | Lys et al. | |
| 2003/0067437 A1 | 4/2003 | McClintock et al. | |
| 2003/0076281 A1 | 4/2003 | Morgan et al. | |
| 2004/0004827 A1 | 1/2004 | Guest | |
| 2004/0041800 A1 | 3/2004 | Daniels | |
| 2004/0043139 A1 | 3/2004 | Daniels | |
| 2004/0207581 A1 | 10/2004 | Miller | |
| 2004/0235227 A1 | 11/2004 | Kawase | |
| 2004/0239586 A1 | 12/2004 | Cok | |
| 2004/0253896 A1 | 12/2004 | Yamazaki | |
| 2005/0030321 A1 * | 2/2005 | Anwar | 345/629 |
| 2005/0040962 A1 | 2/2005 | Funkhouser et al. | |
| 2005/0046646 A1 | 3/2005 | Tobita | |
| 2005/0225976 A1 | 10/2005 | Zampini et al. | |
| 2006/0221599 A1 | 10/2006 | Hornsby et al. | |
| 2006/0284161 A1 | 12/2006 | Tokida | |
| 2007/0148793 A1 | 6/2007 | Yoshida | |
| 2008/0225143 A1 | 9/2008 | Joffer et al. | |
| 2009/0021497 A1 | 1/2009 | Wendler et al. | |
| 2009/0021529 A1 | 1/2009 | Wendler et al. | |
| 2009/0021532 A1 | 1/2009 | Gloege et al. | |
| 2009/0024867 A1 | 1/2009 | Gloege et al. | |
| 2009/0024929 A1 | 1/2009 | Gloege et al. | |

FOREIGN PATENT DOCUMENTS

| | | |
|---|---|---|
| AU | 2005329700 B2 | 9/2006 |
| EP | 1655712 A2 | 5/2006 |
| GB | 2164189 A | 3/1986 |
| JP | 11191494 A | 7/1999 |
| JP | 2005-224983 A | 8/2005 |
| WO | WO-02/073298 A2 | 9/2002 |
| WO | WO-03/060857 A1 | 7/2003 |

OTHER PUBLICATIONS

Baumann, "Management of Multidimensional Discrete Data" VLDB Journal, May 3, 1994, p. 401-444.*

"3-channel constant-current LED Driver with PWM control", (A6280-DS, Rev. 3), Allegro Microsystems Inc, [online]. [archived May 7, 2007]. Retrieved from the Internet: <URL:http://web.archive.org/web/20070507171052/http://www.allegromicro.com/en/Products//Part_Numbers/6280/6280>, (2007), 12 pgs.

"U.S. Appl. No. 10/965,133, Final Office Action mailed Nov. 17, 2009", 9 pgs.

"U.S. Appl. No. 10/965,133, Non Final Office Action mailed Jun. 2, 2008", 5 pgs.

"U.S. Appl. No. 10/965,133, Non Final Office Action mailed Jul. 10, 2006", 5 pgs.

"U.S. Appl. No. 10/965,133, Non Final Office Action mailed Oct. 26, 2007", 6 pgs.

"U.S. Appl. No. 10/965,133, Non-Final Office Action mailed May 25, 2010", 10 pgs.

"U.S. Appl. No. 10/965,133, Notice of Allowance mailed Oct. 18, 2010", 7 pgs.

"U.S. Appl. No. 10/965,133, Response filed Jan. 10, 2007 to Non Final Office Action mailed Jul. 10, 2006", 9 pgs.

"U.S. Appl. No. 10/965,133, Response filed Feb. 14, 2008 to Non Final Office Action mailed Oct. 26, 2007", 16 pgs.

"U.S. Appl. No. 10/965,133, Response filed May 17, 2010 to Final Office Action mailed Nov. 17, 2009", 11 pgs.

"U.S. Appl. No. 10/965,133, Response filed Jun. 2, 2009 to Non Final Office Action mailed Jun. 2, 2008", 13 pgs.

"U.S. Appl. No. 10/965,133, Response filed Aug. 25, 2010 to Non Final Office Action mailed May 25, 2010", 8 pgs.

"U.S. Appl. No. 11/895,424, Non-Final Office Action mailed Mar. 12, 2010", 6 pgs.

"U.S. Appl. No. 11/895,424, Notice of Allowance mailed Sep. 10, 2010", 13 pgs.

"U.S. Appl. No. 11/895,424, Response filed Jun. 11, 2010 to Non-Final Office Action mailed Mar. 12, 2010", 8 pgs.

"European Application Serial No. 08165441.0, Response filed Sep. 27, 2010", 20 pgs.

"European Application Serial No. 08795482.2, Extended European Search Report mailed Jan. 19, 2011", 12 pgs.

"International Application Serial No. PCT/US08/09936, International Preliminary Report on Patentability mailed Aug. 24, 2010", 6 pgs.

"International Application Serial No. PCT/US08/09936, International Search Report mailed Nov. 10, 2008", 1 pg.

"International Application Serial No. PCT/US08/09936, Written Opinion mailed Nov. 10, 2008", 3 pgs.

"International Application Serial No. PCT/US08/09941, International Search Report mailed Nov. 17, 2008", 1 pg.

"International Application Serial No. PCT/US08/09941, Written Opinion mailed Nov. 17, 2008", 6 pgs.

Schwesig, C., et al., "Gummi: a bendable computer", *Proceedings of the SIGCHI Conference on Human Factors in Computing Systems CHI '04*, (Apr. 2004), 263-270.

Van Baar, J., et al., "Seamless multi-projector display on curved screens", *Proceedings of the workshop on Virtual environments 2003 EGVE '03*, (May 2003), 281-286.

* cited by examiner

| | |
|---|---|
| 1) | LED module or controller pixel map (order pixels are clocked out within module), |
| 2) | LED module or controller pixel configuration (16x16), |
| 3) | LED module pixel pitch (23mm), |
| 4) | LED module or controller address (order modules are physically connected with RJ45 cables), |
| 5) | LED module or controller physical location in relation to other LED modules (directly to the right of module address 0x000) |
| 6) | LED module or controller DD4040 output number (module located on DD output 0) |
| 7) | DD4040 memory map (output 0 data stored in address 0x000-0x0FF, output 1 address 0x100-0x1FF) |
| 8) | DD4040 Address, Sign number, DD number, Face number (0-0-0) |
| 9) | DD4040 X_Y start location within the frame |
| 10) | Number of valid pixels per line the DD will accept |

FIG. 2

| Active Word (dec) | Active Word (hex) | Field Name | Cb/Cr Channel 10 bits 0x2XX | | Y Channel 10 bits 0x1XX | | Notes |
|---|---|---|---|---|---|---|---|
| | | | | | Y channel is always 0x1XX except noted | | |
| | | | | | C channel is always 0x2XX except noted | | |
| 0 | 0x 0 | Packet Size | LSB | | MSB | | Number of 20 bit words in this packet |
| 1 | 0x 1 | Frame Flag | 'v' | | 'M' | | Identifies frame as VMax 4 data instead of regular HDTV signal |
| 2 | 0x 2 | | 'a' | | 'x' | | |
| 3 | 0x 3 | Sign Mask | LSB | | MSB | | Bit set for each active sign |
| 4 | 0x 4 | Words/Line | LSB | | MSB | | Number of 20 bit words per line |
| 5 | 0x 5 | Lines/Frame | LSB | | MSB | | Number of lines (each Words/Line long) |
| 6 | 0x 6 | Word Freq | B0 | | B1 | | Estimated word frequency |
| 7 | 0x 7 | | B2 | | B3 | | |
| 8 | 0x 8 | Active Height | LSB | | MSB | | Number of active lines/frame (V=0) |
| 9 | 0x 9 | Active Width | LSB | | MSB | | Number of active 20 bit words/line (H=0) |
| 10 | 0x 0A | Protocol Revision | Minor | | Major | | Rev Major.Minor |
| 11 | 0x 0B | First Active Line | LSB | | MSB | | First line with V blank |
| 12 | 0x 0C | Frames/Sec | LSB | | MSB | | 60,50,30,25, etc. |
| 13 | 0x 0D | Table Line Start | LSB | | MSB | | First line number which contains translation table data |
| 14 | 0x 0E | Table Line End | LSB | | MSB | | Last line number which contains translation table data |
| 15 | 0x 0F | Table Words/Line | LSB | | MSB | | Number of valid translation table data words per line |

FIG. 3

| Active Word (dec) | Active Word (hex) | Field Name | Cb/Cr Channel 10 bits 0x2XX | Y Channel 10 bits 0x1XX | Notes Y channel is always 0x1XX except noted C channel is always 0x2XX except noted |
|---|---|---|---|---|---|
| 0 | 0x 3D | DD Pixels/Line | LSB | MSB | Number of active pixels per line |
| 1 | 0x 3E | Reserved | LSB | MSB | |

FIG. 4

| Active Word (dec) | Active Word (hex) | Field Name | Cb/Cr Channel 10 bits 0x2XX | Y Channel 10 bits 0x1XX | Notes: Y channel is always 0x1XX except noted; C channel is always 0x2XX except noted |
|---|---|---|---|---|---|
| 0 | 0x 0 | Line Status | LSB | MSB | Provides status of current line, ie is valid, or last line in table |
| 1 | 0x 1 | DD Select Address | LSB | MSB | Must match switch or address of DD to accept translation table |
| 2 | 0x 2 | Line Starting Pixel Number | LSB | MSB | Pixel Number of the first data word received on current line |
| 3 | 0x 3 | Output 0 Start Address | LSB | MSB | first memory address to be read and clocked out for this output |
| 4 | 0x 4 | Output 0 End Address | LSB | MSB | Last memory address to be read and clocked out for this output |
| 5 | 0x 5 | Output 0 Last Module Address | LSB | MSB | Address of the last module for this output |
| 6 | 0x 6 | Output 1 Start Address | LSB | MSB | first memory address to be read and clocked out for this output |
| 7 | 0x 7 | Output 1 End Address | LSB | MSB | Last memory address to be read and clocked out for this output |
| 8 | 0x 8 | Output 1 Last Module Address | LSB | MSB | Address of the last module for this output |
| 9 | 0x 9 | Output 2 Start Address | LSB | MSB | first memory address to be read and clocked out for this output |
| 10 | 0x 0A | Output 2 End Address | LSB | MSB | Last memory address to be read and clocked out for this output |
| 11 | 0x 0B | Output 2 Last Module Address | LSB | MSB | Address of the last module for this output |
| 12 | 0x 0C | Output 3 Start Address | LSB | MSB | first memory address to be read and clocked out for this output |
| 13 | 0x 0D | Output 3 End Address | LSB | MSB | Last memory address to be read and clocked out for this output |
| 14 | 0x 0E | Output 3 Last Module Address | LSB | MSB | Address of the last module for this output |
| 15 | 0x 0F | Reserved | LSB | MSB | Reserved for future use |
| 16 | 0x 10 | Reserved | LSB | MSB | Reserved for future use |
| 17 | 0x 11 | Start of Table Data | LSB | MSB | first valid data word on this line |

FIG. 5

| XX Bit[19..2] | EOT Bit[1] | Valid Data Bit[0] |
|---|---|---|

FIG. 6

| XX Bit[19..12] | DD # Bit[11..8] | Face # Bit[7..4] | Sign # Bit[3..0] |
|---|---|---|---|

FIG. 7

1) Data Length: number of data values for current line, standard intel hex format (8 bit)
2) Data Start Address: start address for first data word on current line, standard intel hex format (16 bit)
3) Record Type: type of data for current line, standard intel hex format (8 bit)
4) Active DD Row Size: height of the DD section in pixels, Dak intel hex format (24 bit)
5) Active DD Col Size: width of the DD section in pixels, Dak intel hex format (24bit)
6) Sign ID: DD sign number, Dak intel hex format (24 bit)
7) Face ID: DD face number, Dak intel hex format (24 bit)
8) DD Number ID: DD number within the sign, Dak intel hex format (24 bit)
9) Start Address: DD memory map location for output 0, first pixel, Dak intel hex format (24 bit)
10) End Address: DD memory map location for output 0, last pixel, Dak intel hex format (24 bit)
11) Last Module Address: DD output 0 last module address, Dak intel hex format (24 bit)
12) Last Repeater Address: DD output 0 last repeater card address, Dak intel hex format (24 bit)
13) ... Repeat numbers 9-12 for outputs 1, 2, and 3 ...
14) Checksum: Dak intel hex format (24 bit)

FIG. 8

Example – Module Pixel Map (order pixels must be clocked into module)

| 0 | 1 |
|---|---|
| 2 | 3 |

Example – Module Signal Cable Connection Order

Example – DD Pixel Clock Order

| 0 | 1 |   | 4 | 5 |
|---|---|---|---|---|
| 2 | 3 |   | 6 | 7 |

Addr=0   Addr=1

| C | D |   | 8 | 9 |
|---|---|---|---|---|
| E | F |   | A | B |

Addr=3   Addr=2

Example – DD Pixel Receive Order within Frame

| Frame Line # 32 | 0 | 1 | 2 | 3 | ... |
|---|---|---|---|---|---|
| Frame Line # 33 | 50 | 51 | 52 | 53 | ... |
| Frame Line # 34 | 100 | 101 | 102 | 103 | ... |
| Frame Line # 35 | 150 | 151 | 152 | 153 | ... |

FIG. 10a

Example – Configuration Line Packet

| Active Word (dec) | Active Word (hex) | Field Name | Cb/Cr Channel 10 bits 0x2XX | Y Channel 10 bits 0x1XX | Notes |
|---|---|---|---|---|---|
| 13 | 0x 0D | Tran Table Start Line | 0x14 | 0x00 | First line number which contains translation table data |
| 14 | 0x 0E | Tran Table End Line | 0x18 | 0x00 | Last line number which contains translation table data |
| 15 | 0x 0F | Table Data Words | 0x32 | 0x00 | Number of valid translation table data words for each line |

FIG. 10b

Example – Translation Table Line 0

| Active Word (dec) | Active Word (hex) | Field Name | Cb/Cr Channel 10 bits 0x2XX | Y Channel 10 bits 0x1XX | Notes |
|---|---|---|---|---|---|
| 0 | 0x 0 | DD Switch Address | 0x00 | 0x80 | Must match switch setting on DD to accept translation table |
| 1 | 0x 1 | Line Starting Pixel Number | 0x00 | 0x00 | Pixel Number of the first data word received on current line |
| 2 | 0x 2 | Output 0 Start Address | 0x00 | 0x00 | first memory address to be read and clocked out for this output |
| 3 | 0x 3 | Output 0 End Address | 0x0F | 0x00 | Last memory address to be read and clocked out for this output |
| 4 | 0x 4 | Output 0 Last Module Address | 0x03 | 0x00 | Address of the last module for this output |
| 5 | 0x 5 | Output 1 Start Address | 0x00 | 0x00 | first memory address to be read and clocked out for this output |
| 6 | 0x 6 | Output 1 End Address | 0x00 | 0x00 | Last memory address to be read and clocked out for this output |
| 7 | 0x 7 | Output 1 Last Module Address | 0x00 | 0x00 | Address of the last module for this output |
| 8 | 0x 8 | Output 2 End Address | 0x00 | 0x00 | first memory address to be read and clocked out for this output |
| 9 | 0x 9 | Output 2 Start Address | 0x00 | 0x00 | Last memory address to be read and clocked out for this output |
| 10 | 0x 0A | Output 2 Last Module Address | 0x00 | 0x00 | Address of the last module for this output |
| 11 | 0x 0B | Output 3 Start Address | 0x00 | 0x00 | first memory address to be read and clocked out for this output |
| 12 | 0x 0C | Output 3 End Address | 0x00 | 0x00 | Last memory address to be read and clocked out for this output |
| 13 | 0x 0D | Output 3 Last Module Address | 0x00 | 0x00 | Address of the last module for this output |
| 14 | 0x 0E | Start of Table Data | 0x00 | 0x00 | Pixel 0 module address 0 (DD RX Pixel # 0) |
| 15 | 0x 0F | Table Data | 0x01 | 0x00 | Pixel 1 module address 0 (DD RX Pixel # 1) |
| 16 | 0x 10 | Table Data | 0x04 | 0x00 | Pixel 0 module address 1 (DD RX Pixel # 2) |
| 17 | 0x 11 | Table Data | 0x05 | 0x00 | Pixel 1 module address 1 (DD RX Pixel # 3) |
| 18 | 0x 12 | Table Data | 0x3FF | 0x3FF | Pixels not valid for remainder of line (DD RX Pixel # 4-49) |

FIG. 10c

Example - Translation Table Line 1

| Active Word (dec) | Active Word (hex) | Field | Name | Cb/Cr Channel 10 bits 0x2XX | Y Channel 10 bits 0x1XX | Notes Y channel is always 0x1XX except noted C channel is always 0x2XX except noted |
|---|---|---|---|---|---|---|
| 0 | 0x 0 | DD Switch Address | | 0x00 | 0x80 | Must match switch setting on DD to accept translation table |
| 1 | 0x 1 | Line Starting Pixel Number | | 0x64 | 0x00 | Pixel Number of the first data word received on current line |
| 2 | 0x 2 | Output 0 Start Address | | 0x00 | 0x00 | first memory address to be read and clocked out for this output |
| 3 | 0x 3 | Output 0 End Address | | 0x0F | 0x00 | Last memory address to be read and clocked out for this output |
| 4 | 0x 4 | Output 0 Last Module Address | | 0x03 | 0x00 | Address of the last module for this output |
| 14 | 0x 0E | Table Data | | 0x02 | 0x00 | Pixel 2 module address 0 (DD RX Pixel # 50) |
| 15 | 0x 0F | Table Data | | 0x03 | 0x00 | Pixel 3 module address 0 |
| 16 | 0x 10 | Table Data | | 0x06 | 0x00 | Pixel 2 module address 1 |
| 17 | 0x 11 | Table Data | | 0x07 | 0x00 | Pixel 3 module address 1 |
| 18 | 0x 12 | Table Data | | 0x3FF | 0x3FF | Pixels not valid for remainder of line |

FIG. 10d

Example – Translation Table Line 2

| Active Word (dec) | Active Word (hex) | Field | Name | Cb/Cr Channel 10 bits 0x2XX | Y Channel 10 bits 0x1XX | Notes |
|---|---|---|---|---|---|---|
| 0 | 0x 0 | 0 | DD Switch Address | 0x00 | 0x80 | Must match switch setting on DD to accept translation table |
| 1 | 0x 1 | 1 | DD Switch Address | 0x00 | 0x80 | Must match switch setting on DD to accept translation table |
| 2 | 0x 2 | 2 | Line Starting Pixel Number | 0x64 | 0x00 | Pixel Number of the first data word received on current line |
| 3 | 0x 3 | 3 | Output 0 Start Address | 0x00 | 0x00 | first memory address to be read and clocked out for this output |
| 4 | 0x 4 | 4 | Output 0 End Address | 0x0F | 0x00 | Last memory address to be read and clocked out for this output |
| 4 | 0x 4 | 4 | Output 0 Last Module Address | 0x03 | 0x00 | Address of the last module for this output |
| 14 | 0x 0E | | Table Data | 0x0C | 0x00 | Pixel 0 module address 3 (DD RX Pixel # 100) |
| 15 | 0x 0F | | Table Data | 0x0D | 0x00 | Pixel 1 module address 3 |
| 16 | 0x 10 | | Table Data | 0x08 | 0x00 | Pixel 0 module address 2 |
| 17 | 0x 11 | | Table Data | 0x09 | 0x00 | Pixel 1 module address 2 |
| 18 | 0x 12 | | Table Data | 0x3FF | 0x3FF | Pixels not valid for remainder of line |

FIG. 10e

Example – Translation Table Line 3

| Active Word (dec) | Active Word (hex) | Field Name | Cb/Cr Channel 10 bits 0x2XX | Y Channel 10 bits 0x1XX | Notes |
|---|---|---|---|---|---|
| | | | | | Y channel is always 0x1XX except noted |
| | | | | | C channel is always 0x2XX except noted |
| 0 | 0x 0 | DD Switch Address | 0x00 | 0xC0 | Must match switch setting on DD to accept translation table |
| 1 | 0x 1 | Line Starting Pixel Number | 0x64 | 0x00 | Pixel Number of the first data word received on current line |
| 2 | 0x 2 | Output 0 Start Address | 0x00 | 0x00 | first memory address to be read and clocked out for this output |
| 3 | 0x 3 | Output 0 End Address | 0x0F | 0x00 | Last memory address to be read and clocked out for this output |
| 4 | 0x 4 | Output 0 Last Module Address | 0x03 | 0x00 | Address of the last module for this output |
| 14 | 0x 0E | Table Data | 0x0E | 0x00 | Pixel 2 module address 3 (DD RX Pixel # 150) |
| 15 | 0x 0F | Table Data | 0x0F | 0x00 | Pixel 3 module address 3 |
| 16 | 0x 10 | Table Data | 0x0A | 0x00 | Pixel 2 module address 2 |
| 17 | 0x 11 | Table Data | 0x0B | 0x00 | Pixel 3 module address 2 |
| 18 | 0x 12 | Table Data | 0x3FF | 0x3FF | Pixels not valid for remainder of line |

At this point all pixels controlled by the selected DD have been defined in the translation table. Additional lines of translation table data for the DD would not be required.

TRANSLATION TABLE

CROSS REFERENCES TO RELATED APPLICATIONS

This application claims benefit from the earlier filed U.S. Provisional Application No. 60/808,200 entitled "Translation Table" filed May 24, 2006, which is hereby incorporated into this application by reference as if fully set forth herein. Further, this application is a continuation-in-part of U.S. patent application Ser. No. 10/965,127 entitled "Flexible Pixel String Software and Method" filed Oct. 14, 2004, now abandoned and is related to U.S. patent application Ser. No. 10/965,133 entitled "Flexible Pixel String Hardware and Method" filed Oct. 14, 2004, and both of which are hereby incorporated into this application by reference as if fully set forth herein.

BACKGROUND OF THE INVENTION

1. Field of the Invention

The present invention relates to apparatus and method for configuring a graphical display, and specifically to apparatus and method for configuring a graphical display of custom or arbitrary shape. The invention provides efficient means for configuring and populating such displays with graphical data, where such displays can include channel letter displays, logo or design displays, curved or round displays, or other arbitrary shaped or unusual aspect ratio displays, and can utilize or incorporate flexible pixel strings. The present invention is translation table apparatus and method. The translation table apparatus and method provides for mapping of graphical display data from an initial organizational scheme to an arbitrary new organizational scheme.

2. Description of the Prior Art

Displays have become increasingly more sophisticated, progressing from monochrome incandescent and LED to color to moving or changing displays to video quality displays, and from smaller to larger size, and with more elaborate content and control and driving systems. Channel letter type displays have progressed from simple neon or fluorescent light displays to video type displays. The construction of modern video-type channel letter or arbitrary shaped displays is typically accomplished using standard rectangular grid video components. Such use of rectangular grid video components is awkward and wasteful, and in some implementations lacks the full desired effect that channel letter shaped video components could provide. However, the production of shaped video components in arbitrary shapes is expensive and inefficient at present. Further, the rectangular grid video components and control system can be inadequate for creating the custom shaped displays that are becoming increasingly desired. Thus, there is need for efficient and cost effective production of arbitrary shaped displays and for a way to map standard rectangular image data onto an arbitrary shaped array and software to facilitate the conversion of rectangular to arbitrary shape.

SUMMARY OF THE INVENTION

The translation table apparatus and method provides for mapping of graphical display data which may be initially organized as a regular matrix such as a rectangular array of rows and columns corresponding to specific pixels, and translating the graphical display data to adapt the graphical display data to a matrix of arbitrary shape and spacing and orientation, to one or more pixel strings, or a combination of such strings or matrices.

The general purpose of the present invention is to provide a display in any arbitrary shape. Such a display can be useful for signage, presentation of video information, and so forth, in channel letters or other arbitrary shapes as are desired.

According to one embodiment of the present invention, there is provided software for a video-capable display, where the display comprises multiple pixels arranged in an arbitrary configuration with flexible connections.

According to another embodiment of the present invention, there is provided software for mapping a regular matrix of display data to at least one matrix or flexible pixel string of arbitrary shape.

According to still another embodiment of the present invention, there is provided computing hardware having translation table software loaded in memory.

According to a further embodiment of the present invention, there is provided computing hardware executing translation table software.

According to a still further embodiment of the present invention, there is provided machine-readable media storing translation table software.

According to yet another embodiment of the present invention, there is provided software for a display controller, where such software maps a starting rectangular image data onto an array of logical rows and logical columns of pixels corresponding to a physical shape and/or size which is different from that of the starting rectangular image.

According to a still further embodiment of the present invention, there is provided a method of transforming a rectangular image data array into an image data array of arbitrary shape.

According to an additional embodiment of the present invention, there is provided a method of mapping an image data array of one shape to an image data array of different shape.

According to another additional embodiment of the present invention, there is provided software for creating a map of rectangular rows and columns to logical rows and columns of arbitrary shape from a computer drawing of pixels arranged in the arbitrary shape.

According to yet another additional embodiment of the present invention, there is provided a method of creating a software map from a physical shape, where the software map facilitates the mapping of a data array of a first shape onto a data array of a second shape.

According to still yet another additional embodiment of the present invention, there is hardware executing translation table software which creates a software map from a physical shape, where the software map facilitates the mapping of a data array of a first shape onto a data array of a second shape.

One significant aspect and feature of the present invention is the efficient utilization of the minimum number of lighting elements and other costly electronic components.

Another significant aspect and feature of the present invention is translation table software which provides for utilization of displays of any arbitrary shape. The software also enables such flexibility by allowing a library of unique pixel elements and pixel arrays to be created and saved. This software then allows a user to choose and select different desired pixel elements (a string of pixels being one example of a pixel element) and then assists the user in creating the logical to physical row and column positioning translation.

Still another significant aspect and feature of the present invention is software for multiple display modules.

Yet another significant aspect and feature of the present invention is a straightforward process for making a translation table corresponding to one or more physical shapes.

A further significant aspect and feature of the present invention is a straightforward process for making a translation table from one or more software description(s) of particular shapes.

A still further significant aspect and feature of the present invention is translation table software for mapping or addressing a particular pixel or display element for sending image data to the particular pixel or display element to activate the particular pixel or display element in a desired manner and timing even if the pixel or display element is part of a flexible pixel string with arbitrary shape and not part of a regular rectangular grid or array.

Having thus described embodiments of the present invention, it is the principal object of the present invention to provide a display in any arbitrary shape, and to provide means for sending standard rectangular image data to the display in a manner that mapped graphical data can be properly displayed on the arbitrary shaped display. Such a display can be useful for signage, presentation of video information, and so forth, in channel letters or other arbitrary shapes as are desired.

One object of the present invention is to provide software for efficient and cost effective display of graphical data.

Another object of the present invention is to provide software for a display with moving video capabilities.

Yet another object of the present invention is to provide software for displays that are curved, angled, channel letter, logo shaped, or otherwise shaped.

Still another object of the present invention is to provide one or more translation tables for one or more display elements or modules which can be used as a components in a display with arbitrary shape.

A further object of the present invention is to provide translation table apparatus which can be used to efficiently map graphical data for displays that are straight, rectangular, curved, angled, channel letter, logo shaped, or otherwise shaped.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 illustrates system architecture for a translation table of the present invention;

FIG. 3 shows an example of the line I configuration packet details for a translation table of the present invention;

FIG. 4 shows sign configuration packet details;

FIG. 5 is an example translation table line format;

FIG. 6 is word display module line status bit definitions;

FIG. 7 is word display module select address bit definitions;

FIG. 8 shows header line details for serial transmission;

FIGS. 10*a*-10*e* show example configuration line packet and example translation table lines 0-3;

DETAILED DESCRIPTION OF THE PREFERRED EMBODIMENTS

The present invention is utilized generally for enhanced display of data on graphical display stations. Particularly popular nowadays are displays using LED technology, but other types of displays can also utilize the present invention. The present invention is particularly beneficial in a display architecture which allows multiple display modules, although this is not required for the present invention. In one use of the present invention, a display architecture is envisioned in which a display module has at least one data input and at least one data output; preferably, a display module has multiple data outputs such as 4, for example. The display module controls a number of graphical indicators, which can be monochromatic lamps, liquid crystal display elements, light emitting diodes, or color picture elements (pixels) as are in use in the art. In an example, the display module can control up to 512K RGB pixels. Each data output controls a number of indicators or pixels, with such color and intensity data and frame rates as desired and allowed by the hardware, such as up to 256K RGB pixels at 16 bits per color with 5 bits of dimming and a refresh rate of 120 Hz. The data output can interconnect LED modules or controllers with many different pixel pitches and pixel arrangements in any order using a cable, such as a cable with RJ45 connectors. Utilizing cabling of uniform or standard type provides a simpler and more cost-effective setup. The high degree of flexibility inherent in the present display architecture with multiple interconnected data inputs and outputs for transfer of graphical data in a flexible and easily configurable manner makes the old system of configuring a display by pixel rows and columns obsolete as a display need no longer conform to a rectangular shape or be limited to a single pixel pitch.

Figure 13:
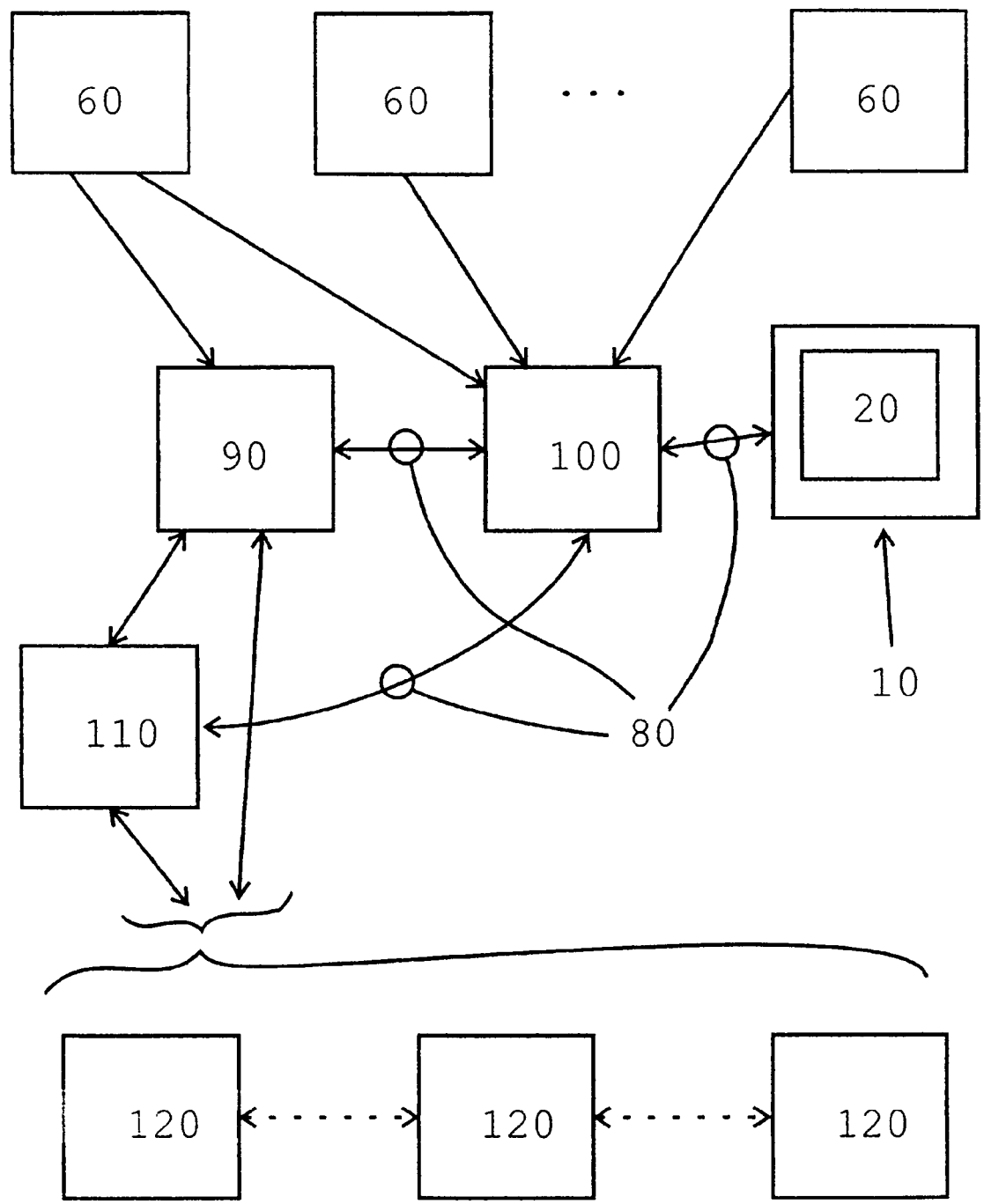

FIG. 13 illustrates some aspects of a display architecture utilizing the present invention. To take the best advantage of a flexible display architecture with multiple interconnected display modules, displays, and arbitrary shaped displays, a configuration scheme that makes use of a translation table is required. A schematic illustration (FIG. 13) shows an example arrangement indicating how graphical data 60 which can be of multiple types (video, image, static text, ticker, etc.) or multiple sources as indicated, is mapped by translation table 20 which is incorporated into or stored on memory device 10, and transmitted to be displayed on display components 120. Graphical data 60 can be transmitted to video processor 90 or other preprocessing computer 100 as indicated and further transmitted to display controller 110. Graphical data and translation table transmission is indicated at 80. Many of the connections and transmissions are illustrated as bidirectional, indicating that certain data can flow in either direction, but this need not be the exact same data, but could have portions added, removed, or modified in the two directions. For example, diagnostic or configuration information could be transferred in one direction, and graphical data and translation table could be transferred in the other direction, and so forth. Graphical data and optionally one or more translation tables can be transmitted from video processor 90 and display controller 110 to multiple display components 120 as indicated by the braces. Display components 120 can be displays, display stations, display modules, pixels, pixel strings, or other display components that may be employed.

Figure 1:
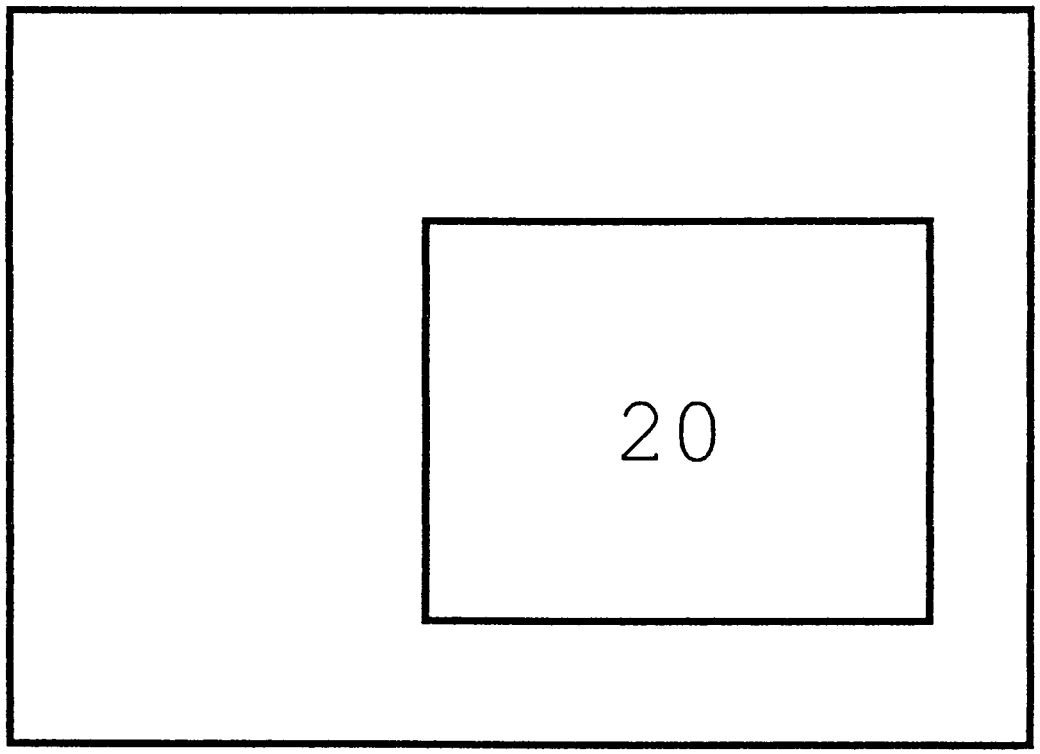
FIG. 1 is a memory device incorporating the present translation table invention.

The present invention is apparatus, software, and method for translation table mapping of graphical display data to an arbitrary shape array or set of arrays. The present invention can be incorporated into a graphical display station or controller, or be utilized in a preprocessing environment such as a computer used to prepare graphical display data prior to transmitting or transporting the data to the graphical display station or controller. The present invention can be incorporated into a memory device component of such a computer, display station, or controller. The present invention can be incorporated into other memory devices or media, such as CD-rom, DVD-rom, computer disks or disk drives, RAM, ROM, and the like. FIG. 1 illustrates memory device 10 incorporating translation table 20; the memory device 10 of FIG. 1 can incorporate software for constructing one or more translation tables 20, or it can incorporate data required for constructing a translation table, or it can incorporate the actual translation table 20. Translation table 20 is essentially a "map" by which incoming pixels can be placed in any order or position within the display memory map. Typically, translation table 20 is stored in memory on the display station; alternatively, translation table 20 can be stored in memory on a preprocessing computer, and the mapped data transferred to the display station. To display the data as desired, any transferred mapped data is transferred with sufficient contextual information to allow the data to be properly interpreted; for example, the data to be displayed, pixel address information, timing information, verification data, and so forth are transferred as appropriate. For example, an first array with graphical display data is created, such as from an incoming data source such as a video feed, text feed, or other source, or from a memory device. The address corresponding to each pixel is read from the first array, and a second array is created by translating each address from the first array to an address in the second array, and populating each address in the second array with the corresponding graphical data. Alternatively, a single array can be utilized, containing at least the graphical display data for each pixel, corresponding first address, and corresponding second address. The first address corresponds to the original shaped configuration such as a rectangular grid corresponding to a video frame, and the second address corresponds to a second shaped configuration such as pixel strings, channel letters, or other shaped configuration for the mapped data. The first address can be simply the location in the array rather than a populated data field, since the incoming structure is a known shape, typically a regular rectangular grid. A frame of graphical data can be sent to the display controller or display station component with a few lines containing a portion of the translation table, or the entire translation table can be sent to the display at once, followed by graphics frames. The data, including the translation table, is organized into a prescribed format which contains required sizing, spacing, number of elements, verification, start and end field, and so forth to allow the data to be properly utilized by the display station. As each new pixel is received, the address corresponding to that specific pixel will be read from the translation table, the data stored in the translation memory address will be the address to which the pixel gets written in the display memory. The preprocessing computer or display controller outputs will begin reading the display data at the specific start address specified in the translation table and continue reading sequential addresses until all of the pixels have been read and outputted to the display modules of the display station, such as LED modules. In this way the preprocessing computer or display controller outputs do not need to be aware of the actual sign configuration since it is taken care of on the front end by the translation table.

Generating a Translation Table

Although the display will be the device that ultimately "uses" the translation table, the table itself will typically be generated on the preprocessing computer by a configuration program. This is because there can be multiple display modules within a sign and multiple signs within a graphical data frame, and each individual display may not be connected to, or aware of, all of the various display modules within a system. To successfully generate the translation table, the configuration program requires many specific details of the system architecture such as elements depicted on FIG. 2. Examples of these details are LED module pixel map, clocking order within module, pixel configuration and pitch, addressing order, input and output designation, display or display module identity information, display module starting address within frame, pixels per line, and so forth.

The system data needed to generate the translation table will be entered by the user or read back from the display(s) through a diagnostic path. Each display module in the system requires its own unique translation table based on the sign number, display module identity (such as a numerical designation)number within the sign, and face number (since a display can have multiple faces). Having a unique translation table also allows for a single pixel to be assigned to multiple display modules for unique display configurations or to easily allow displays with different pixel pitches to show identical data. A translation table can accommodate a number of unique pixels only limited by the system architecture. For example, one convenient architecture provides for up to 1,048,575 pixels. Any pixels not defined for a particular display module are placed outside of the memory map range for that display module.

Each active display pixel the selected display module receives is assigned a number from 0 up to the maximum number of unique pixels of the particular system architecture being used, such as 1,048,575 for example, starting in the position defined by the display module start coordinates (e.g., X, Y). In other words, if a translation table and the corresponding graphical display data spans multiple display modules, the correct data is read for each display module by starting at the correct location in the translation table. For example, the pixel numbers as specified sequentially within each line are read from the starting pixel for a particular display module until the line pixel count has been reached for the selected display module. The pixel number specified in this manner is essentially the translation table memory address where the translation data value is stored. The translation data value preferably has a prescribed number of bits so that no special end indicator or size indicator is required; for example the translation data value may be a 20-bit number ranging from 0 up to 1,048,567 for example (for an example architecture with up to 1,048,575 unique pixels and where 1,048,568-1,048,575 are reserved for non-graphical data use) and indicates the address in the display module memory where the specified RGB pixel value will be stored. In this example, the most significant eight translation values are reserved and cannot be used to indicate a position in the display module memory. Note that the maximum translation table value may be physically limited by the display module hardware and may be less than 1,048,567 pixels.

Even with this limitation, frames with more than 1,048,575 pixels can be accommodated by assigning different X, Y start coordinates to different display modules. Each display module addressed with the translation table will always be limited by the system architecture, such as to 1M pixels, so only the first 1M pixels received from X, Y start coordinates for the specified display module can be assigned a translation table value.

Transmitting a Translation Table (Preferred Data Protocol VMAX)

Translation Table Configuration

The translation table is transmitted within a graphical data frame. In a present example, all values are preferably in HEX for convenience and consistency. A configuration packet contains the start and end line numbers within the graphical data frame that contain valid translation table values as well as the number of valid translation table data words per line. Typically, only a few lines per frame will contain translation table data to conserve as much bandwidth as possible for display data. In this case, the entire translation table will be received or built up over many frames. Each translation table line will preferably have a diagnostic or error check applied to it such as by incorporating checksums. If an error is detected in a line, the corresponding data will not be stored in display module memory but rather the previous translation table values will be maintained in the display module memory until a future frame arrives without a detectible error. Further diagnostic information can be transmitted as well, such as to log or report the error. The last translation table line typically contains "don't care" values which are not valid translation table data or display data. This is to provide time for a diagnostic or error check to be performed and the final line of valid translation table data to be stored to memory on the display module. However, this setup does allow entire frames of translation table data to be transmitted with no display data when desired, and this could be used on a sign service start, for example, or in other situations where the translation table must be transmitted to the display more quickly than normal, such as a rapid configuration change to obtain a special visual effect. FIG. 3, illustrates a Line 1 Configuration Packet example and FIG. 4 illustrates a Sign Configuration Packet (DD Words/Line Location) example, which are examples of address, configuration, and graphical data consistent with translation table transmission according to the present invention.

Translation Table Line Format

A preferable format for translation table lines according to the present invention is as follows. Each line containing translation table data consists of a fixed amount of data (such as a predetermined number of 20-bit words, for example) where header information is placed followed by a variable amount of data (such as an arbitrary or customizable number of 20-bit data words) containing the actual translation table data. Refer to FIG. 5, which illustrates an example Translation Table Line Format for the present invention. Although the specific organization of the line format can vary from this example, it can be seen that key elements are included. For example, diagnostic and status data, display module address or identity data, addresses or identity of pixel, memory addresses, for each output, as well as the actual graphical data corresponding to the addresses or identities specified. In this example, there are exactly 4 display module outputs for this system architecture, so an initial series of configuration data of predetermined length can be used to specify the sizes and locations of data, and the variable amount of graphical display data can then follow, properly interpreted by examination of this initial series of configuration data. Thus, great flexibility in terms of addressing, order, line length, display arrangement, and so forth are obtained with the present invention.

The following is a more specific description of the example of FIG. 5. The Line Status word contains important information about the current translation table line. The Valid Data bit is set to indicate the line contains valid translation table data; if the bit is cleared, the DD will not accept the translation table data on the current line. The End of Table (EOT) bit is set to indicate the current line as the last valid line containing translation table data for the selected display module (the display module has received its complete translation table). Undefined bits are "don't cares", but should be set equal to zero for future expandability. FIG. 6, illustrates Word Display Module Line Status Bit Definitions.

The target display module select address consists of three four-bit values specified by the sign number, display module number, and face number; unused bits are reserved and are "don't cares", but should also be set to a value of zero. Each display module will compare its current select address with the header select address and will only accept the translation table data on an address match.

If the display module switch positions are all set to position "F", the display modules will be in an automatic addressing mode where each display module in a chain will be sequentially addressed from 0-FFF. In this situation, the select address comparisons will work the same as before except the single 12-bit value is compared instead of the three four-bit values. FIG. 7, illustrates Word Display Module Select Address Bit Definitions.

The line starting pixel number is used to indicate to the display module what part of the translation file is being received on the current line. For example, if the display module is receiving the beginning of a translation table, the starting pixel number would be 0x00000 and indicates the first data word number is 0x00000. The second data word would be (starting pixel number+1) and will continue sequentially until the end of the line is reached and the final data word (starting pixel number+N) is received. The next translation table line would contain a starting pixel number of N+1 and again the data words would be numbered sequentially until the end of the line. This process will continue until the entire translation table has been transmitted.

For system architectures with 4 data outputs, the following is a further example. The next line of the translation table header contains the output 0 starting memory address for the display module. This address corresponds to the address location within the display module display memory where the first pixel data value to be read and clocked out for output 0 should be stored. Outputs 1, 2 and 3 work in a similar way.

The next line of the translation table header contains the output 0 ending memory address for the display module. This address corresponds to the address location within the display module display memory where the last pixel data value to be read and clocked out for output 0 should be stored. This information is primarily provided for the backup display module transmission which in this example clocks out data in the reverse order. Outputs 1, 2 and 3 work in a similar way.

The next line of the translation table header contains the output 0 ending module address. This is the last module address on the specified output. This information is primarily provided for the backup display module transmission, which in this example addresses the modules in the reverse order. This also provides a quick means by which the backup display module can verify the expected number of LED modules (or other pixel groups, display subcomponents, etc.) with the actual number of detected LED modules. Outputs 1, 2 and 3 work in a similar way.

Transmitting a Translation Table (Serial RS232 Portocol)

An alternative method to send the translation table information is as a modified extended Intel Hex file over an RS232 serial or compatible connection. The Intel Hex file contains a header portion that consists of the basic configuration information and the payload portion that contains actual translation table data. The header information is designated by a record type of 0x05 and the payload information is designated by a record type of 0x00. the Intel Hex file is modified slightly from the extended Intel Hex file specification in that the data words are 24 bits (6 ASCII characters) instead of the normal 8 bits (2 ASCII characters). This format will allow up to a maximum of 256 24-bit words per line within the Intel Hex file. Checksums are calculated on 8-bit boundaries. As in the preferred (Vmax) transmission scheme, the Hex file address of a given word within the Hex file refers to the actual pixel number received by the data distributor; the value of the Hex file word is the address that the display pixel should actually be stored to in the display module memory.

The header information contains much of the same information transmitted for each line in the preferred (Vmax) transmission scheme. The primary exception is that the translation table pixel row and column size is also included. This will allow display data to be outputted correctly for the panels or modules in a display regardless of whether the display configuration is changed or not. FIG. 8 illustrates an example format for the header information for transmission within an Intel Hex file.

Translation Table Example

Figure 9:
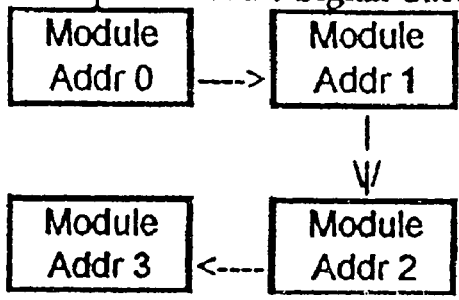
FIG. 9 is a simple example translation table.

The simplified translation table example of FIG. 9 is for a display consisting of four 2×2 modules arranged in a square and connected to data output 0. The active frame size is 64 by 96 words, which translates to 64 pixels by 64 data pixels for this example. The display module switch settings are 0,0,0, the display module (Y, X) start location is (32, 1), the translation table words/line value is 82 (96 words per line−14 words header), and the data pixel/line value is set at 50.

Portions of a more complete translation table are illustrated in FIGS. 10*a*-10*e*. The configuration packet contains the translation table start line, end line, and number of data words; these are sent as word numbers 0x0D, 0x0E, and 0x0F, respectively. For this example, the start line value is 20 and the end line value is 24, which provides 4 lines of translation table data per frame (the last line must remain unused for error checking). The first 14 words for each translation table line contain the header information, which means 50 words remain on each line for actually transmitting the table data (200 words per frame). At 200 words per frame, it will take 21 frames for the entire translation table to be transmitted to the display module(s).

Mode of Operation

Figure 11:
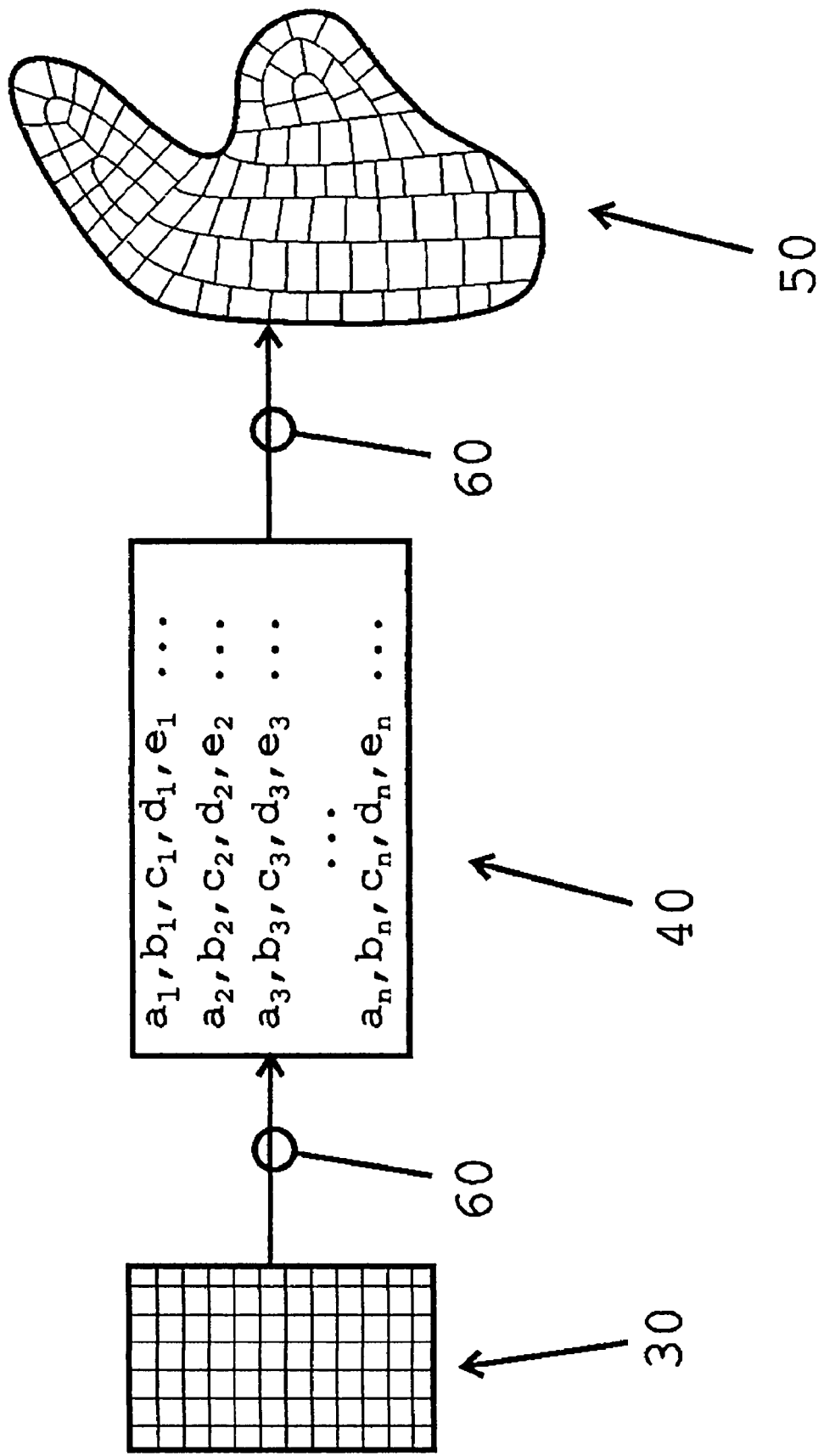
FIG. 11 illustrates a schematic arrangement for a system utilizing the present invention for arbitrary pixel orientation.
Figure 12:
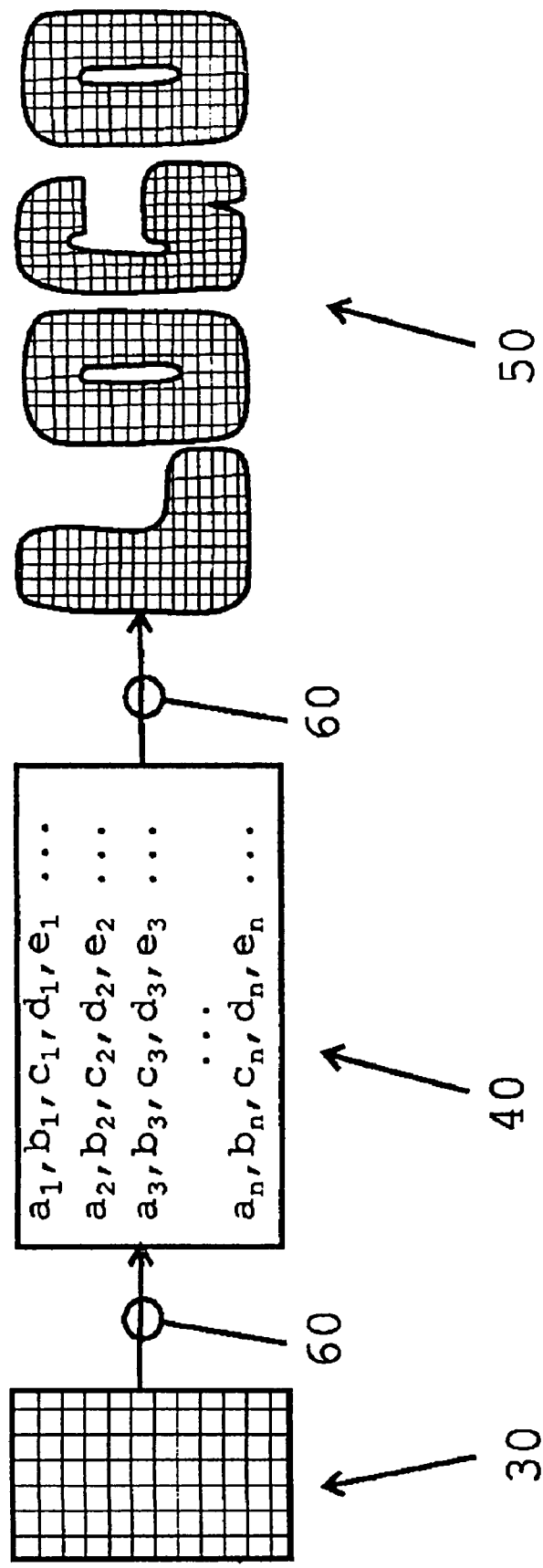
FIG. 12 illustrates a schematic arrangement for a system utilizing the present invention for channel letters; and, FIG. 13 illustrates a more detailed schematic arrangement of apparatus, method, and mode of operation of the present invention showing an example with typical elements.

The present invention can be utilized in several modes of operation as best illustrated by FIGS. 11-13. FIGS. 11-12 illustrates an embodiment in which graphical data is stored in memory in a first array and a translation table is stored in memory and the translation table is used to map the graphical data into an arbitrary shaped second array for display on one or more display modules. The second array may be stored in memory on a preprocessing computer, or may be stored locally on a display controller or display module. The translation table itself can be constructed in several ways. In one embodiment, the translation table is designed and constructed on one or more preprocessing computers so that the desired shaped effect is obtained.

In another embodiment, a master translation table is constructed for each particular display module, and these master translation tables are assembled to form a complete translation table for the entire assembly of display modules for which are to be included in the display of this particular display data. The master translation tables could be stored in the various display modules for which they apply, or stored on a memory device which could be supplied by the manufacturer or by the output of preprocessing computer(s). Alternatively, the pixel configuration information needed to construct the master translation tables can be encoded or stored in the hardware or software of the display modules; a preprocessing computer obtains this information from the display modules to construct master translation tables or the complete translation table for the assembly of display modules.

In this way, use of a translation table allows generic graphical data can be to be translated to the graphical format required by a particular display assembly. If a different user (or a different display assembly coordinating with the display assembly being discussed), has a different display configuration (different shape, different logo or channel letters, and so forth) but it desired to display at least a portion of the same graphical data on the different display assembly, the raw or incoming graphical data does not have to be custom configured for each display assembly. Rather, the incoming graphical data (which may be stored on a memory device, which may be a "live" feed of video, textual, or other visual data being "streamed" to the various display assemblies) can be transmitted in a standard format to all display stations, and the translation tables associated with the particular display modules provide for conversion or mapping of the data as required for each display module.

In FIG. 11, a shaped second array corresponding to multiple display modules or pixel strings is illustrated, for which the arrangement of pixels within the display(s) is known but arbitrary. This is particularly advantageous when a special effect distortion is desired, or when cost-effective construction of the display requires pixels to be oriented in other than a normal rectangular grid.

In FIG. 12, channel letter type displays are illustrated, in which the same rectangular grid is used for orientation of pixels, but the display itself has arbitrary shape. This is particularly advantageous, for example, for displaying undistorted graphical data only in the channel letters, without the waste associated with transmitting all the unused graphical data which will not be displayed because it is outside the channel letters.

In another embodiment, aspects of FIGS. 11-12 can be combined, with arbitrary orientations of pixels within an arbitrary shaped display, with the present translation table invention employed to map the data as required.

FIG. 13 illustrates additional detail for the apparatus, method, and mode of operation. FIG. 13 is merely an example showing required elements plus examples of optional elements which can be grouped or selected as desired for the particular embodiment being utilized. In the example of FIG. 13, graphical data is illustrated as being transmitted to a preprocessing computer and to a video processor. A translation table is stored on a memory device as indicated, and graphical data and translation table data are transmitted between components as illustrated. Connection and data transfer to a display controller and multiple display components are also shown. The elements illustrated in FIG. 13 are not always required, and multiple similar elements may be employed for a more complicated system, but this includes the most typical elements.

Various modifications can be made to the present invention without departing from the apparent scope thereof.

Translation Table Parts List 10 memory device
20 translation table
30 first array
40 translation table
50 second array
60 graphical data
70 graphical data transmission
80 graphical data and translation table transmission
90 video processor
100 preprocessing computer
110 display controller
120 display component It is claimed:

1. A method for displaying graphical data on a display of arbitrary shape comprising the steps of:
    providing a graphical display having a non-rectangular, arbitrary shape, graphical data having an initial rectangular organizational scheme, a preprocessing computer, and a translation table;
    loading the graphical data into memory on the preprocessing computer;
    loading the translation table into a memory device on the preprocessing computer; and,
    using the translation table to map the graphical data into a new organizational scheme configured for display on the graphical display having a non-rectangular, arbitrary shape, wherein the non-rectangular, arbitrary shape includes a channel letter display.

2. The method of claim 1, wherein the initial rectangular organizational scheme includes graphical data organized as a matrix in a rectangular array of rows and columns.

3. The method of claim 1, wherein the graphical display includes a plurality of LED modules.

4. A method, for execution by one or more processors, for displaying graphical data on a display of arbitrary shape, comprising:
    providing a graphical display having an arbitrary shape;
    transforming a first graphical data array corresponding to a first shape to a second graphical data array corresponding to the arbitrary shape of the graphical display; and
    transmitting the transformed data to the graphical display, wherein the arbitrary shape includes a channel letter.

5. The method of claim 4, wherein transforming includes converting the first graphical data array from a rectangular graphical data array into the second graphical data array which corresponds to logical rows and logical columns of pixels, wherein the pixels define the arbitrary shape which is different than the shape of a starting rectangular image.

6. The method of claim 4, wherein transforming includes providing a map for converting rectangular rows and columns to logical rows and columns of the arbitrary shape.

7. The method of claim 4, wherein transforming includes using a translation table which is stored in a memory.

8. The method of claim 7, wherein the translation table is provided a first address corresponding to a pixel of the first graphical data array and translates the first address to a second address of the second graphical data array.

* * * * *